United States Patent Office 3,145,199
Patented Aug. 18, 1964

3,145,199
17,20-OXIDO-6,16-DIALKYL-PREGNANES AND PROCESS FOR THE PREPARATION THEREOF
Robert P. Graber and Martin B. Meyers, Minneapolis, Minn., assignors to General Mills, Inc., a corporation of Delaware
No Drawing. Filed Feb. 9, 1961, Ser. No. 88,030
9 Claims. (Cl. 260—239.55)

This invention relates to 17-oxygenated 6,16-dialkyl progesterones, esters thereof and methods used in the preparation thereof. In particular, this invention relates to compounds of the formulae

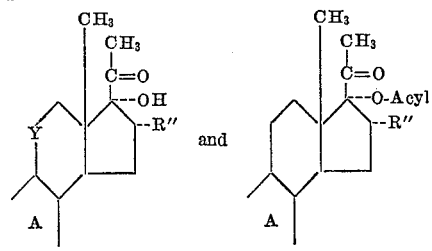

where Y is selected from the group consisting of

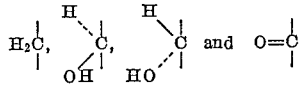

A is selected from the group consisting of

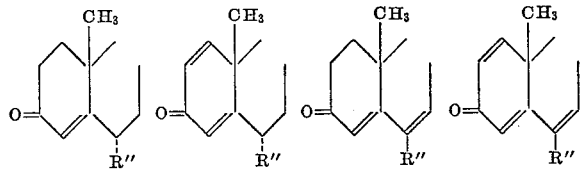

and R″ is an alkyl group having from 1 to 8 carbon atoms. The acyl group may take the form

RC— where R is an alkyl, cycloalkyl, aralkyl or alkoxyaralkyl group, the alkyl group generally having from 1 to 12 carbon atoms and the aryl group generally being phenyl.

Illustrative of such ester groups are the acetate, caproate, cyclopentyl propionate, phenyl propionate, p-propoxyphenyl propionate, p-hexoxyphenyl propionate and p-dodecoxy propionate.

In addition, novel compounds are provided in the method of preparation of the above mentioned compounds, such compounds having the following formulae

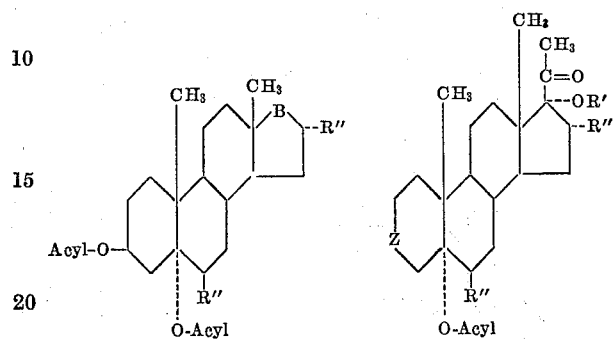

R″ is as previously defined, B is selected from the group consisting of

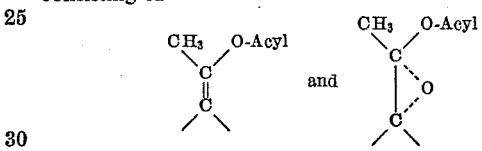

both cis and trans forms, Z is selected from the group consisting of

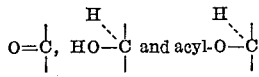

and R′ is selected from the group consisting of hydrogen and acyl groups.

The compounds of the present invention are progestational hormones in themselves and may be useful as intermediates for conversion to other progestogens or to cortical hormones.

These novel compounds may be prepared in accordance with the following reaction scheme:

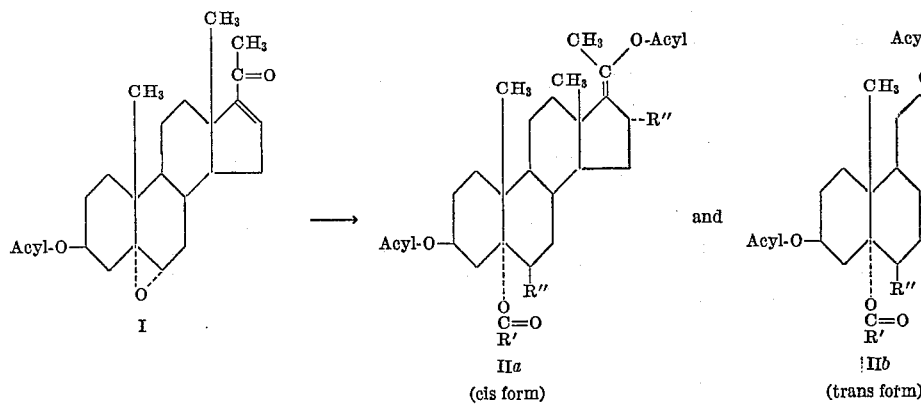
I

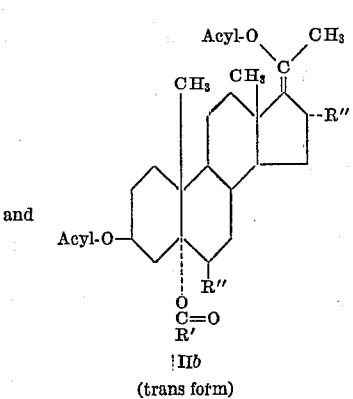
IIa (cis form)    IIb (trans form)

↓

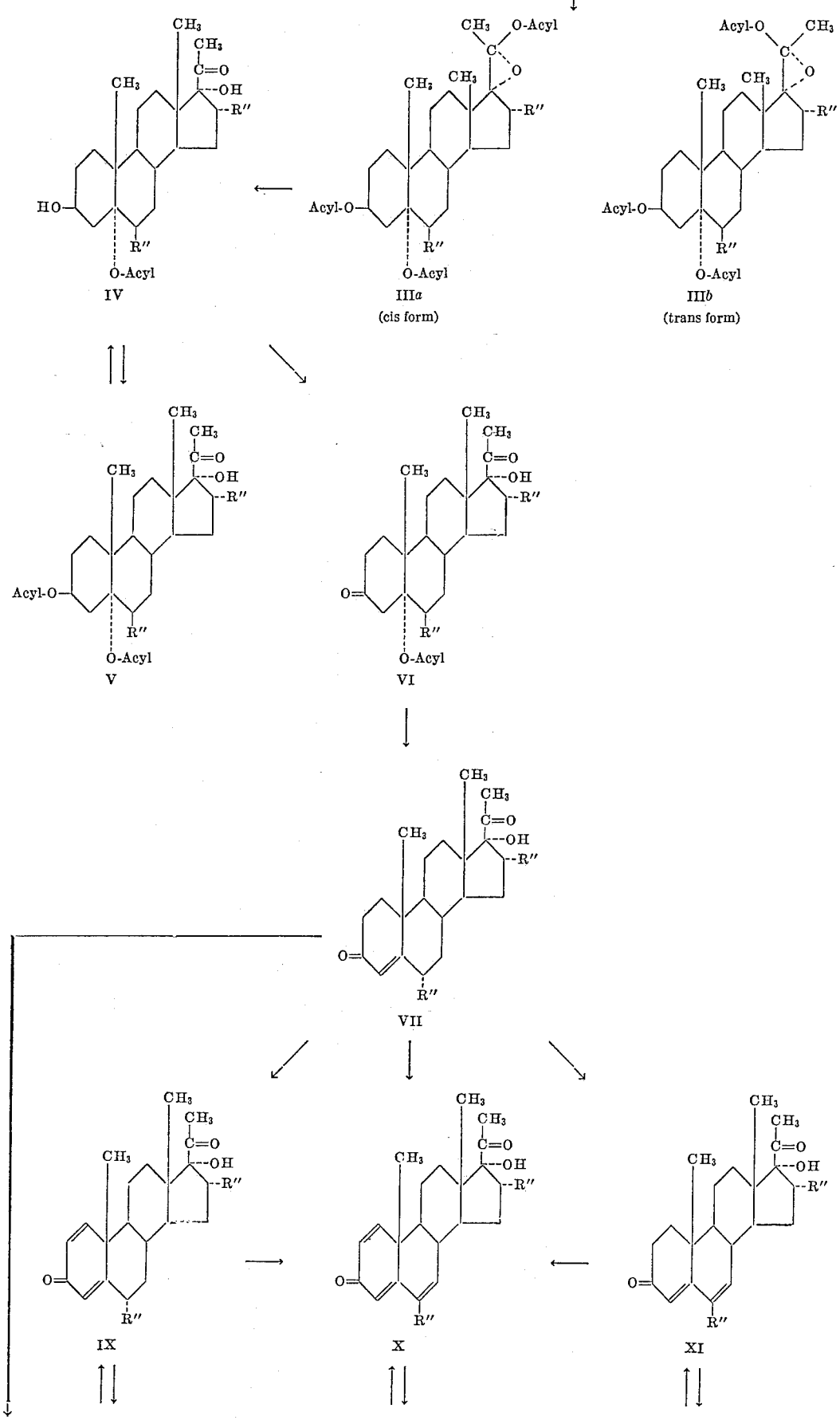

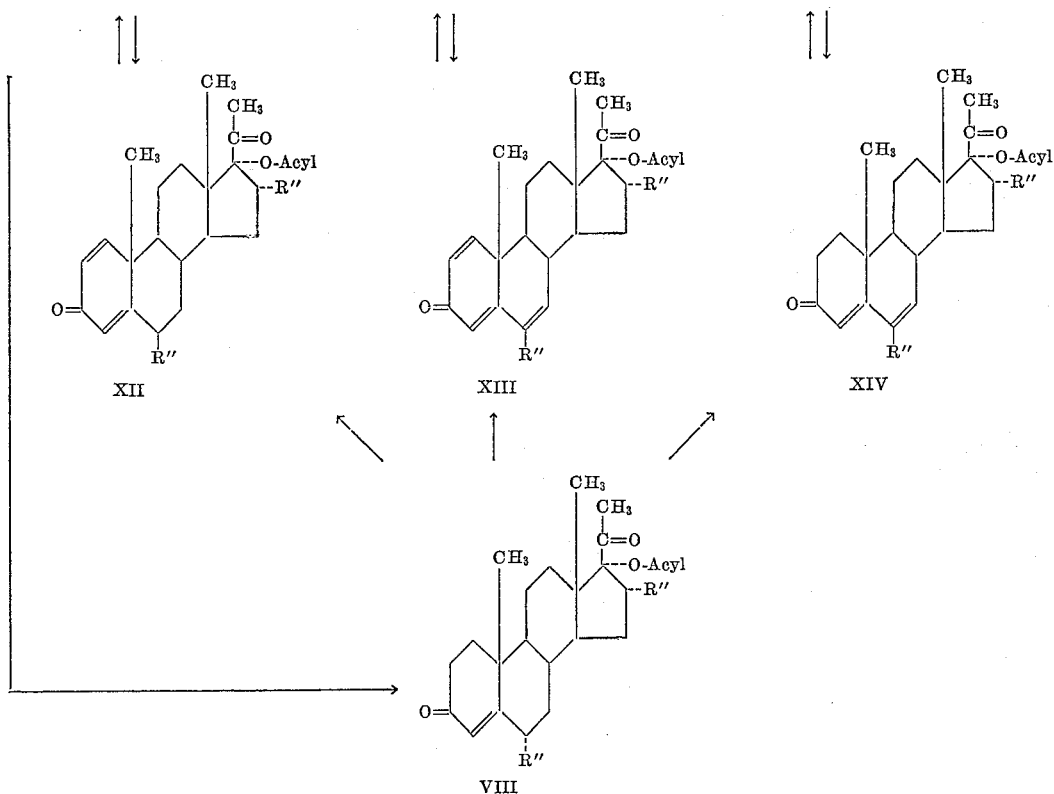

In the foregoing reaction scheme, only the hydrogen substituted carbon atom at position 11 has been shown. However, by well known and readily understood methods such as fermentation with certain microorganisms, the carbon atom at position 11 may be converted to a hydroxylated carbon atom, which may then be oxidized to a ketone group, in the compounds represented by Formulae VII, IX, X and XI and it is hereby understood that such converted products also fall within the scope of the present invention.

It is therefore an object of this invention to provide novel 17-oxygenated 6,16-dialkyl steroid compounds.

It is also an object of this invention to provide novel 17 oxygenated 6,16 dialkyl progesterones having the formulae

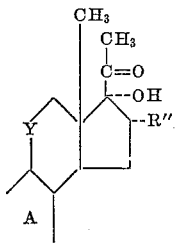

and

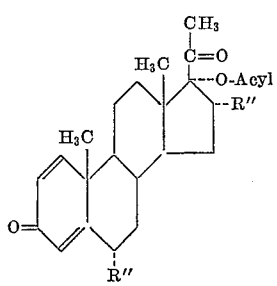

where Y is selected from the group consisting of

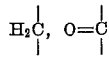

and

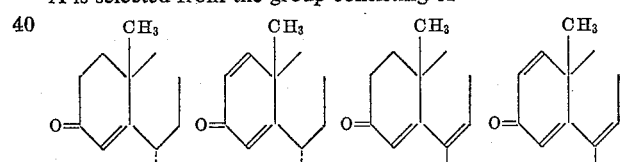

A is selected from the group consisting of

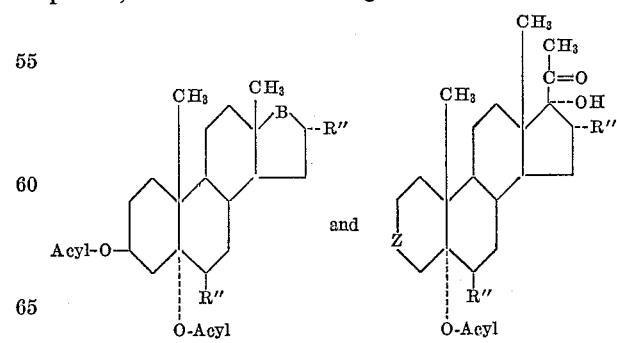

and R″ is an alkyl group having from 1 to 8 carbon atoms.

It is also an object of this invention to provide a novel method of preparation of these compounds.

It is further an object of this invention to provide novel steroid intermediates readily converted to these compounds, said intermediates having the formulae

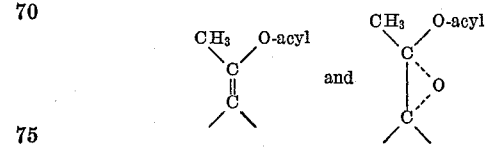

where R″ is an alkyl group having from 1 to 8 carbon atoms, B is selected from the group consisting of the cis and trans forms of and Z is selected from the group consisting of

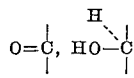

and

For convenience and simplicity of illustration, in the following discussion R″ is a methyl group, Y is

and the acyl group is acetyl or caproyl but it is hereby understood that this is merely illustrative of the process and products of the present invention and is not to be construed as limiting the invention.

The starting material represented by Formula I may be prepared from the mixture of α and β isomers prepared by epoxidation of unsaturated steroid compounds with per-acids, in this instance the epoxidation of 16-dehydropregnenolone acetate. The α oriented isomer which usually predominates may then be harvested by conventional crystallization procedures or in accordance in our copending application Serial No. 59,203, filed September 29, 1960. In accordance with the teachings of said copending application, the mixture of α and β epoxides may be converted to the α oxido compound alone by (a) opening the oxirane ring by treatment with perchloric acid in aqueous acetone to produce a single trans diol, one of the hydroxyl groups being a secondary hydroxyl group (b) regeneration of only the α epoxide by esterification of the secondary hydroxyl group by treatment with methane sulfonyl chloride in pyridine and (c) elimination of the ester group then formed by treatment with weak alkali such as an aqueous mixture of sodium bicarbonate and pyridine. From this point on, the following is a detailed description of the various steps of the process from the starting material, 5α,6α-oxido-16-pregnen 3β-ol-20-one 3 acetate (Formula I).

(1) *Dialkylation of 5α,6α-oxido-16-pregnen-3β-ol-20-one 3-acetate* (I).—Treatment of the above 5α,6α-oxido compound with methyl Grignard reagent produces an intermediate dimethylated Grignard complex which, without isolation, is treated with an acetylating agent. There is thus produced a mixture of the cis and trans forms of 6β,16α - dimethyl - 17(20) - pregnen - 3β,5α,20-triol 3,5,20-triacetate (IIa and IIb).

The reaction is normally carried out with a large excess of methyl magnesium bromide. Only slightly over one mole is required for the 1,4-addition at carbon 16. The opening of the 5α,6α-oxide grouping requires an excess of reagent in order to conduct the reaction in a reasonable time. The solvent mixture normally used is a mixture of ethyl ether and toluene. Other solvents or solvent mixtures may be used such as benzene and xylene either alone or in mixtures with ether. The reaction is normally carried out at the reflux temperature of the solvent or solvent mixture for a period of two to three hours. The reaction is normally not carried out under an inert atmosphere, but this may be advantageous. Other alkyl magnesium bromides may be employed to give other dialkyl compounds. Also, alkyl magnesium iodides and dialkyl magnesium compounds may be used, in which the alkyl groups have from 1 to 8 carbon atoms.

The 1,4-addition of the Grignard reagent to the Δ16-20-ketone system is catalyzed by the addition of cuprous chloride. Normally, the salt is added in a ratio of 0.1 mole per mole of steroid; lesser ratios are substantially as effective, but larger ratios show no increased beneficial effects. Other cuprous halides may also be used, such as cuprous bromide or cuprous iodide.

After the termination of the reaction with the Grignard reagent, the reaction mixture is cooled to about 15 to 20° C. and the acylating agent added carefully maintaining the temperature below about 25° C. The acylating agents normally used are acetyl chloride or acetic anhydride, but other acylating agents such as propionyl chloride or propionic anhydride, and those having a carbon length of from 1 to 12 carbon atoms, may be used. The time of addition is normally about 10 to 15 minutes. After adding the acylating agent, the reaction mixture is heated at about 50–55° for 3 to 4 hours or stored at room temperature for 16 to 24 hours.

The reaction mixture is finally treated carefully with saturated aqueous ammonium chloride to decompose the excess Grignard reagent. Other ammonium salts may be used and even water alone may be used followed by acidification with, for example, hydrochloric acid. The solvent layer is separated, the aqueous layer re-extracted with the solvent, the combined solvent layer and extracts washed free of inorganic materials, dried and the solvents removed in vacuo to give the crude dialkylpregnenetriol triacylate. This product is a mixture of cis and trans isomeric forms which are difficult to separate. In practice, therefore, these isomers are carried on without separation. The presence of the desired functional groups is indicated by the characteristic infrared spectrum.

(2) *Epoxidation of 6β,16α-dimethyl-17(20)-pregnen-3β,5α,20-triol 3,5,20-triacetate* (IIa and IIb).—The 17-(20)-enol acetate is epoxidized by treatment with a peracid to give the corresponding 17α,20-oxido-20-acetoxy compound as a mixture of cis and trans isomeric forms. The reaction is normally carried out by treatment with perbenzoic acid in benzene solution. Other solvents may be used such as toluene, chloroform or mixtures of these solvents. Other peracids may be used such as monoperphthalic acid or peracetic acid. In the latter case, the solvent normally used is chloroform and the reaction mixture is buffered by the use of sodium acetate. The time for complete epoxidation will vary with the peracid used; for example, with perbenzoic acid, the reaction is complete in about three hours at room temperature. Monoperphthalic acid requires a longer time and peracetic acid a somewhat shorter time when the reactions are carried out at the same temperature.

At the end of the epoxidation reaction, the excess peracid is destroyed with, for example, potassium iodide and sodium thiosulfate. Ferrous sulfate is used when the peracid is peracetic acid. Any inorganic materials are removed by thorough washing of the solvent layer and the steroid recovered by evaporation of the solvents in vacuo. There is thus produced a cis-trans mixture of 17α,20 - oxido - 6β,16α - dimethylpregnan - 3β,5α,20 - triol 3β,5α,20-triacetate (IIIa and IIIb). The mixture is difficult to separate and is normally carried on without separation. The presence of the desired functional groups is indicated by the characteristic infrared spectrum.

(3) *Alkaline hydrolysis of 17α,20-oxido-6β,16α-dimethylpregnan-3β,5α,20-triol 3β,5α,20-triacetate* (IIIa and IIIb).—Hydrolysis of the 3β,5α,20-triacetate to the 5-monoacetate of 6β,16α-dimethylpregnan-3β,5α,17α-triol-20-one (IV) is accomplished by treatment with potassium carbonate in hot aqueous methanol. Under these alkaline hydrolysis conditions, the ester functions at positions 3 and 20 are hydrolyzed but the sterically hindered tertiary ester at position 5 is left unhydrolyzed. Hydrolysis of the ester at position 20 produces an intermediate oxidoalcohol which is unstable under the conditions of the reaction and rearranges in situ to the 17α-hydroxy-20-ketone system. There is thus produced the above-mentioned dimethyltriolone 5-monoacetate.

The above hydrolysis and rearrangement is normally carried out with aqueous methanolic potassium carbonate at the reflux temperature of the mixture. Other alkalis and solvent mixtures may be used, however; for example, potassium hydroxide in aqueous ethanol, sodium hydroxide in aqueous methanol or ethanol. Using these stronger bases, the reflux period is somewhat shorter.

Also, with these stronger bases, the reaction may be carried out at room temperature, but longer times are required.

The product is normally isolated by acidification with acetic acid, evaporation in vacuo to remove most of the alcohol, and extraction with a suitable solvent such as ethyl acetate. Other water soluble organic acids may be used and even mineral acids such as hydrochloric acid providing no excess is introduced. Suitable extraction solvents are ethyl acetate, chloroform, methylene chloride, and the like.

The solvent extracts are washed free of acids and inorganic materials and the solvents removed in vacuo to give the crude dimethyltriolone monoacetate (IV). Purification is difficult but the identity of the product is shown by its characteristic infrared spectrum.

(4) *Acetylation of 6β,16α-dimethylpregnan-3β,5α,17α-triol-20-one 5-acetate (IV)*.—The dimethyltriolone (IV) is difficult to purify, but the corresponding 3β,5α-diacetate (V) is more easily purified. Thus, the crude product is treated with an acylating agent. Normally acetic anhydride in the presence of pyridine is used, but acetic anhydride alone may also be used. The reaction is normally carried out with an excess of acylating agent for a period of 16–24 hours at room temperature. Raising the temperature decreases the time required.

The crude diacetate is isolated by carefully diluting the reaction mixture with water which decomposes the excess anhydride, and then extracting the steroid with ethyl acetate. Other water-immiscible solvents may be used, such as ether, benzene, chloroform, and the like. The combined solvent extracts are washed to remove acids, pyridine, and inorganic materials, if present. The dried extracts are then concentrated in vacuo to remove the solvent. The crude resinous product is dissolved in ether and caused to crystallize by adding petroleum ether. Other solvent mixtures may be used. The crystalline material which separates is the desired 3,5-diacetate (V) in a somewhat impure form.

The pure 6β,16α-dimethylpregnan-3β,5α,17α-triol-20-one 3β,5α-diacetate (V) is obtained by chromatography over neutral alumina. The crystalline solid obtained above is dissolved in benzene and placed on the column of neutral alumina. The column is developed with mixtures of Skellysolve B-benzene. Skellysolve B is essentially an n-hexane hydrocarbon fraction. The fractions eluted with 4:1 and 2:1 mixtures of Skellysolve B-benzene are combined and crystallized from methylene chloride-Skellysolve B to give the pure dimethyltriolone diacetate. Other solvent mixtures may also be used for recrystallization such as acetone-Skellysolve B, acetone-petroleum ether, and the like.

(5) *Hydrolysis of 6β,16α-dimethylpregnan-3β,5α,17α-triol-20-one 3β,5α-diacetate (V)*.—The selective hydrolysis of the 3-acetate function in the dimethyltriolone diacetate (V) is accomplished by treatment with potassium bicarbonate in aqueous methanol. The reaction is normally conducted at the reflux temperature for about one hour. Other alkaline agents may also be used such as sodium bicarbonate, potassium carbonate and potassium hydroxide. With the strong bases such as the latter, the time of reflux is somewhat shorter. The solvent may also be mixtures of water and ethyl alcohol.

After the reflux period, the mixture is brought to neutrality and then evaporated in vacuo. After dilution with water, the solid product which precipitates is removed by filtration, washed to neutrality with water and dried. Recrystallization from aqueous methanol affords the pure monoacetate (IV). Other solvent mixtures may be used such as aqueous ethanol, acetone-petroleum ether and the like.

(6) *Oxidation of 6β,16α-dimethylpregnan-3β,5α,17α-triol-20-one 5-acetate (IV)*.—The oxidation of the 3β-alcohol function of the dimethyltriolone monoacetate (IV) to the 3-ketone function is normally carried out in acetone solution by treatment with a solution of chromium trioxide in dilute aqueous sulfuric acid. The reaction is very rapid and is normally complete in about four minutes. At the end of this time, the excess oxidizing agent is destroyed by adding aqueous sodium bisulfite solution. Other ketone solvents may be used providing they are not oxidized themselves. The oxidation may also be carried out with chromium trioxide in acetic acid, sodium dichromate in acetic acid or chromium trioxide in pyridine.

The product is recovered by adding ethyl acetate to the mixture and separating the solvent layer. The solvent layer is washed free of inorganic material and acids and then dried. After removal of the solvents in vacuo, the solid product is recrystallized from acetone-Skellysolve B mixtures to give the pure 6β,16α-dimethylpregnan-5α,17α-diol-3,20-dione 5-acetate (VI). The recrystallization may also be carried out using other solvent mixtures such as acetone-petroleum ether, ethyl acetate-Skellysolve B and the like.

(7) *β-Elimination and epimerization of 6β,16α-dimethylpregnan-5α,17α-diol-3,20-dione 5-acetate (VI)*.—The 5α-acetoxy-3-ketone (VI) is converted to the 6α,16α-dimethyl-17α-hydroxyprogesterone (VII) by treatment with an acid in an alcoholic solvent. These conditions effect β-elimination of the 5α-acetoxyl group together with one of the hydrogens at C–4 to form the double bond between carbon atoms 4 and 5. The α,β-unsaturated ketone thus formed is 6β,16α-dimethyl-17α-hydroxyprogesterone. Under the same reaction conditions and by a process of enolization-ketonization the α-hydrogen at C–6 is labilized. This permits the 6β-methyl group to assume the thermodynamically more stable α-configuration with the hydrogen being in the β-configuration. Thus the acid conditions effect β-elimination of the 5 α-acetoxyl group followed by epimerization of the 6-methyl from the β- to the α-configuration. Normally the 5α-acetoxy-3-ketone is heated under reflux in ethanol containing a small amount of concentrated aqueous hydrochloric acid for a period of about one hour. Other strong acids may also be used such as p-toluenesulfonic acid, 2,4-dinitrobenzenesulfonic acid, and the like. Other alcoholic solvents may be used, such as methanol or isopropanol. The eact times of reflux will depend upon the acid and the boiling point of the solvent.

The product (VII) is isolated from the alcoholic solution by removal of 70–80% of the solvent in vacuo and dilution with water. The precipitated solid is removed by filtration, washed thoroughly with water and dried. Recrystallization from acetone-Skellysolve B mixtures affords the pure 6α,16α-dimethyl-17α-hydroxyprogesterone (VII). Other solvents or solvent mixtures may also be used.

The β-elimination and epimerization may also be carried out under basic conditions, for example with potassium hydroxide in aqueous ethanol. The conditions must, however, be very carefully controlled as to time, temperatures, etc., in order to avoid concomitant homoannulation of the D-ring with its attached 17α-hydroxy-20-ketone system.

(8) *Acylation of 6α,16α-dimethyl-17α-hydroxyprogesterone (VII)*.—The 17α-hydroxyl group is acetylated to form 6α,16α-dimethyl-17α-hydroxyprogesterone acetate (VIII) by treatment with acetic anhydride and p-toluenesulfonic acid in glacial acetic acid solution. The reaction is normally carried out at room temperature for periods of 16–72 hours. Other acylating agents may be used, such as propionic anhydride, caproic anhydride, and the like. Other acid solvents, such as propionic acid or caproic acid may be used. The acid used as the solvent must, however, correspond to the anhydride used. Also, other acid catalysts such as 2,4-dinitrobenzene sulfonic acid may be used. The time of the reaction at room temperature will vary within the 16–72 hour period, depending upon the reagents and solvents used.

The product is isolated by pouring the reaction mixture into about ten volumes of water. The product is normally precipitated as a solid and can be removed by filtration. In some cases, the product is not crystalline and is separated by extraction with a solvent such as ethyl acetate, chloroform, methylene chloride, and the like.

The crude filtered or extracted 17-ester is frequently contaminated with the corresponding Δ3,5-dienol-3-acetate or other 3-acylate. The 17-monoacetate or other acylate may be separated by chromatography. Normally, however, the crude 17-ester is treated with hydrochloric acid in methanol at room temperature for 2-4 hours. This treatment effects selective hydrolysis of the 3-acetate of the Δ3,5-dienol system, leaving the 17-ester function intact.

The alcoholic solution is carefully concentrated to remove part of the alcoholic solvent and is then diluted with water and the product isolated by filtration or extraction as above. The pure 6α,16α-dimethyl-17α-hydroxyprogesterone 17-ester (VIII) is then purified by crystallization from the conventional solvents or it may be purified by chromatography over neutral alumina followed by crystallization.

(9) *Chloranil dehydrogenation of 6,16-dimethyl-17α-hydroxy progesterones and the corresponding 17-esters.*—The dehydrogenation of 6α,16α-dimethyl-17α-hydroxyprogesterone (VII) to the corresponding $\Delta^6$-dehydro and $\Delta^{1,6}$-bisdehydro derivatives (XI and X resp.) is accomplished by treatment with chloranil in a suitable solvent. Treatment in refluxing t-butanol produces the $\Delta^6$-dehydro derivative and in refluxing secondary amyl alcohol, the $\Delta^{1,6}$-bisdehydro derivative. In addition, the $\Delta^6$-dehydro compound (XI) is converted to the $\Delta^{1,6}$-bisdehydro compound (X) by carrying out the reaction in refluxing sec-amyl alcohol.

The dehydrogenation of the 17-esters of 6α,16α-dimethyl-17α-hydroxyprogesterone (VIII) to the corresponding $\Delta^6$-dehydro and $\Delta^{1,6}$-bisdehydro derivative (XIV and XIII, resp.) is achieved in the same manner as above for the 17α-hydroxy parent compounds. The preparation of the $\Delta^{1,6}$-bisdehydro derivative may again be carried out directly, i.e., XIII from VIII, or stepwise, i.e. VIII→XIV→XIII.

The $\Delta^{1,6}$-bisdehydro derivatives, X and XIII, are also obtained by chloranil dehydrogenation of the corresponding $\Delta^1$-dehydro compounds, IX and XII, when one employs sec-amyl alcohol as the reaction solvent.

Finally, the $\Delta^6$-dehydro-17α-hydroxy compound (XI) and the $\Delta^{1,6}$-bisdehydro-17α-hydroxy compound (X) may be acylated at the C-17 hydroxyl in the manner described in section 8 above to give the corresponding 17-acylates XIV and XIII, respectively.

(10) *Introduction of the $\Delta^1$-double bond into 6,16-dimethyl-17α-hydroxyprogesterones and the corresponding 17-esters.*—The introduction of the $\Delta^1$-double bond into ring A of the nucleus may be accomplished as described above by the use of chloranil in refluxing sec-amyl alcohol. Under these conditions the $\Delta^6$-double bond is normally introduced prior to the dehydrogenation at the one and two carbon atoms. The $\Delta^1$-double bond may be introduced selectively, however, by the dehydrogenating action of selenium dioxide, by fermentation with certain species of microorganisms, or by treatment with 2,3-dichloro-5,6-dicyanobenzoquinone.

Treatment of either 6α,16α-dimethyl-17α-hydroxyprogesterone (VII) or its 17-esters (VIII)) with selenium dioxide in t-butyl alcohol containing a small amount of glacial acetic acid affords the corresponding $\Delta^1$-dehydro-derivatives (IX and XII, resp.). This same transformation may be accomplished by the action of certain species of microorganisms, e.g. *Bacillus sphaericus* (A.T.C.C. No. 7055) or *Corynebacterium simplex* (A.T.C.C. No. 6946).

The preferred procedure, however, involves the use of 2,3-dichloro-5,6-dicyanobenzoquinone (DDQ) in boiling dioxane or benzene. About 1.1–2.0 moles of DDQ are normally employed per mole of steroid. In benzene, the reaction is normally conducted in refluxing benzene for a period of about 5 hours. At the end of this time, the hydroquinone which has formed is present largely as an insoluble suspension. The mixture is diluted with methylene chloride and filtered to remove most of the hydroquinone and then extracted several times with 5% aqueous sodium hydroxide to remove the remainder of the hydroquinone and the unreacted DDQ. After washing the solvent layer with water, the solvents are removed in vacuo to give the crude $\Delta^1$-dehydro compound. The pure material is obtained by recrystallization or by chromatography over alumina.

The above process utilizing DDQ for the introduction of the $\Delta^1$-double bond may also be applied to the $\Delta^6$-dehydro derivates XI and XIV. Under the conditions described above, the $\Delta^6$-dehydro derivates XI and XIV are converted to the corresponding $\Delta^{1,6}$-bisdehydro derivates X and XIII, respectively.

Finally, the $\Delta^1$-dehydro-6α,16α-dialkyl-17α-hydroxyprogesterone (IX) may be acylated to the corresponding 17α-acylate (XII) as described in section 8 above.

Thus, it is apparent that one may carry out the introduction of the 17-ester function and $\Delta^1$- and $\Delta^6$-double bonds by a variety of reaction sequences.

The invention can best be illustrated by means of the following examples.

EXAMPLE I

*Dialkylation of 5α,6α-Oxido-16-Pregnen-3-β-ol-20-One Acetate*

To a well stirred mixture of 410 ml. of 3 M methyl magnesium bromide in ether and 4.0 g. of cuprous chloride, was added a solution of 22.4 g. of 5α,6α-Oxido-16-pregnen 3β-ol-20-one acetate in 1050 ml. of toluene over a period of 13 minutes. With continued stirring the mixture was heated to reflux for 2 hours and 10 minutes, then cooled and 150 ml. of acetic anhydride added in 15 minutes. After 30 minutes at room temperature, the mixture was heated to 50–55° for 3 hours and 30 minutes. With cooling, 700 ml. of saturated aqueous ammonium chloride solution was added. The organic layer was separated, washed three times with water and once with saturated salt solution, dried, and the solvent evaporated in vacuo to give an oil. This amorphous product consisted of the cis and trans isomers of 6β,16α-dimethyl-17(20)-pregnen-3β,5α,20 - triol 3β,5α 20 - triacetate (II*a* and *b*); the mixture exhibited characteristic bands in the infrared at 5.77, 5.88, 8.11, 8.18, 8.41, 8.53 and 8.67μ.

EXAMPLE II

*Epoxidation of 6β,16α-Dimethyl-17(20)Pregnen-3β,5α,-20-Triol 3,5,20-Triacetate*

The residual oil was taken up in 150 ml. of benzene, and 170 ml. of a 0.37 N solution of perbenzoic acid in benzene was added. After standing three hours the reaction mixture was diluted with water containing potassium iodide and sodium thiosulfate. The organic layer was separated and washed successively with 5% aqueous sodium bicarbonate solution, water and saturated sodium chloride solution, dried and the solvent evaporated to give an amorphous residue. This crude epoxide (III*a* and *b*) exhibited the characteristic bands in the infrared at 5.77, 5.87, and 8.11μ.

EXAMPLE III

*Alkaline Hydrolysis of 17α,20-Oxido-6β16α-Dimethyl-Pregnan-3β,5α,20-Triol 3β5α,20-Triacetate*

The solid was dissolved in 400 ml. of methanol, the solution heated to boiling and a solution of 10 g. of potassium carbonate in 100 ml. of water was added. The reaction mixture was refluxed for 90 minutes, then cooled and treated with 10 ml. of glacial acetic acid.

After removing ⅔ of the original volume by evaporation, water anr ethyl acetate were added. The organic layer was separated and washed successively with water, 5% aqueous sodium bicarbonate solution and saturated sodium chloride solution. After drying the solvent was removed by evaporation in vacuo, leaving the crude dimethyltriolone (IV) which could not be crystallized but showed the characteristic bands in the infrared at 2.77, 2.86, 5.78, 5.87, and 591 (sh.)$\mu$.

EXAMPLE IV

*Acetylation of 6β,16α-Dimethylpregnan-3β,5α,17α-Triol-20-One 5-Acetate*

The crude 5-monoacetate was taken up in 65 ml. of pyridine and treated for 20 hours with 15 ml. of acetic anhydride. Water was then added and the resulting oil extracted with several portions of ethyl acetate. The organic extracts were washed sucessively with water, dilute hydrochloric acid, twice with water and with saturated sodium chloride solution. After drying, the solvent was evaporated to give a foam which was redissolved in 50 ml. of ether. Three hundred ml. of Skellysolve B was added and the solution allowed to stand at 7° for 22 hours. The resulting crystalline solid was removed by filtration and washed with Skellysolve B, weight 4.7 g. The solid was dissolved in benzene and placed on 200 g. of neutral alumina. Fractions of 250 ml. each were taken as follows:

| No. | Eluent | Weight (mg.) | Appearance |
|---|---|---|---|
| 1 | 4:1 Skelly B-Benzene | 4 | Oil. |
| 2 | do | 43 | Do. |
| 3 | do | 365 | Crystalline. |
| 4 | do | 418 | Do. |
| 5 | do | 403 | Do. |
| 6 | do | 323 | Do. |
| 7 | do | 224 | Do. |
| 8 | do | 179 | Do. |
| 9 | do | 143 | Do. |
| 10 | do | 129 | Do. |
| 11 | do | 108 | Do. |
| 12 | do | 87 | Do. |
| 13 | do | 72 | Do. |
| 14 | do | 54 | Do. |
| 15 | do | 39 | Do. |
| 16 | 2:1 Skelly B-Benzene | 56 | Do. |
| 17 | do | 90 | Do. |
| 18 | do | 70 | Do. |
| 19 | 1:1 Skelly B-Benzene | 151 | Do. |
| 20 | do | 97 | Do. |
| 21 | do | 73 | Do. |
| 22 | Benzene | 144 | Do. |
| 23 | do | 224 | Do. |
| 24 | do | 136 | Do. |
| 25 | do | 97 | Do. |
| 26 | 19:1 Benzene-Ether | 104 | Do. |
| 27 | do | 81 | Do. |
| 28 | do | 65 | Do. |
| 29 | 1:1 Benzene-Ether | 60 | Do. |
| 30 | do | 89 | Do. |
| 31 | do | 55 | Oil. |

Fractions 3 through 19 were combined and recrystallized from a mixture of methylene chloride and Skellysolve B to give 2.29 g. of 6β,16α-dimethylpregnan-3β,5α,17α-triol-20-one 3,5,-diacetate melting at about 205–210°. Successive recrystallizations from acetone and Skellysolve B mixtures gave material melting at about 206.5–208.5°, $[\alpha]_D^{26}$ —27.5° (1%, chloroform).

*Analysis.*—Calculated for $C_{27}H_{42}O_6$: C, 70.10; H, 9.15. Found: C, 69.79; H, 9.18.

Fractions 23 through 30 were combined and recrystallized from a mixture of methylene chloride and Skellysolve B, producing 0.52 g. of 6β,16α-dimethyl-pregnan-3β,5α-diol-20-one 3 acetate, M.P. 233–200°–$[\alpha]_D^{26}$ +21.3° (1%, chloroform).

EXAMPLE V

*Hydrolysis of 6β,16α-Dimethylpregnan-3β,5α,17α-Triol-20-One 3β,5α-Diacetate*

A mixture of 30 ml. of methanol and 300 mg. of 6β,16α-dimethyl-pregnan-3β,5α,17α-triol-20-one 3,5-diacetate was treated with a solution of 200 mg. of potassium bicarbonate in 3 ml. of water. The mixture was heated under reflux for 60 minutes, 1 ml. of glacial acetic acid added and the solution then cooled and evaporated to ⅕ of the original volume. Fifty ml. of water was added and the resulting solid removed by filtration, washed with water and dried, M.P. 183–193°. Successive crystallizations from aqueous methanol gave 6β,16α-dimethylpregnan-3β,5α,17α-triol-20-one 5-acetate as a hydrate, M.P. 186–190°, $[\alpha]_D^{26}$ —27.3 (1%, chloroform).

*Analysis.*—Calculated for $C_{25}H_{40}O_5 \cdot H_2O$: C, 68.46; H, 9.65. Found: C, 68.60, 68.78; H, 9.64, 9.68.

EXAMPLE VI

*Oxidation of 6β,16α-Dimethylpregnan-3β,5α,17α-Triol-20-One 5-Acetate*

To a solution of 1.83 g. of 6β,16α-dimethylpregnan-3β,5α,17α-triol-20-one 5-acetate in 100 ml. of acetone was added dropwise with stirring in 80 seconds, 2 ml. of about 8 N aqueous chromic acid, prepared as follows: 2.67 g. of chromium trioxide was dissolved in a mixture of 10 ml. of water and 2 ml. of concentrated sulfuric acid. After 4 minutes total time, aqueous sodium sulfite was added, the mixture diluted with ethyl acetate, and the organic layer separated and washed successively with 5% aqueous sodium bicarbonate solution and saturated sodium chloride solution. The extracts were dried and the solvent evaporated to give 1.77 g. of 6β,16α-dimethylpregnan-5α,17α-diol-3,20-dione 5-acetate which after successive recrystallizations from acetone and Skellysolve B mixtures melted at about 161–163°, $[\alpha]_D^{26}$ —26.9° (1% chloroform) and analyzed as the monohydrate.

*Analysis.*—Calculated for $C_{25}H_{38}O_5 \cdot H_2O$: C, 68.77; H, 9.24. Found: C, 68.64, 68.74; H, 9.36, 9.29.

EXAMPLE VII

*β-Elimination and Epimerization of 6β,16α-Dimethylpregnan-5α,17α-Diol-3,20-Dione 5-Acetate*

A suspension of 1.67 g. of 6β,16α-dimethylpregnan-5α,17α-diol-3,20-dione 5-acetate in 150 ml. of absolute ethanol was prepared and to this was added 0.7 ml. of concentrated hydrochloric acid. The mixture was heated under reflux for 55 minutes, then cooled and evaporated to ⅕ of the original volume. After dilution with 250 ml. of water, the resulting solid was removed by filtration and washed with water, giving after drying 1.50 g. of 6α,16α-dimethyl-17α-hydroxyprogesterone which on recrystallizations from acetone and Skellysolve B mixtures melted at about 203–207°, $[\alpha]_D^{26}$ +53.5° (1%, chloroform), $\lambda_{max.}^{EtOH}$ 242 m$\mu$, $\epsilon$15,400, $\lambda_{max.}^{CS_2}$ + $CCl_4$ 5.86, 5.93, 6.20$\mu$

*Analysis.*—Calculated for $C_{23}H_{34}O_3$: C, 77.05; H, 9.56. Found: C, 76.64; H, 9.65.

EXAMPLE VIII

*Acetylation of 6α,16α-Dimethyl-17α-Hydroxy-Progesterone*

A solution of 3.0 g. of 6α,16α-dimethyl-17α-hydroxyprogesterone (VII) in 90 ml. of glacial acetic acid was prepared. The reaction flask was flushed several times with nitrogen and then a solution of 2.4 g. of p-toluenesulfonic acid in 90 ml. of glacial acetic acid and 30 ml. of acetic anhydride was added. The mixture was stirred and kept under a nitrogen atmosphere at room temperature for 16 hours. The resulting solution was poured into 1.5 liters of ice water and the precipitated solid removed by filtration, washed thoroughly with water and dried in vacuo. The solid was dissolved in 150 ml. of methanol and the solution treated with 1.5 ml. of concentrated hydrochloric acid for 3½ hours at room temperature in a nitrogen atmosphere. The solution was then concentrated in vacuo at room temperature to about one-fifth of the original volume and diluted with water. The suspension was extracted three times with ethyl acetate. The combined extracts were washed with water, 5% aqueous sodium bicarbonate until neutral, again with water, with saturated sodium chloride solution, and finally dried over magnesium sulfate. After filtration and removal of the solvent in vacuo, a crude amorphous product was obtained which on crystallization from acetone-hexane afforded 6α,16α - dimethyl - 17α - acetoxyprogesterone (VIII), M.P. 169–171°, $[\alpha]_D^{27}$ +69.0° (chloroform), $\lambda_{max.}^{EtOH}$ 242 mμ (ε15,800), $\lambda_{max.}^{CCl_4}$ 5.73, 5.82, 5.84, 6.20, 8.00 and 11.50μ

EXAMPLE IX

*Preparation of 6α,16α-Dimethyl-17α-Hydroxyprogesterone Caproate*

A stirred mixture of 0.80 g. of 6α,16α-dimethyl-17α-hydroxy progesterone (VII), 40 ml. of n-caproic acid and 12 ml. of freshly distilled n-caproic anhydride was treated under nitrogen with 0.62 g. of p-toluene sulfonic acid monohydrate. The mixture was allowed to stir for 70 hours at room temperature. Five ml. of pyridine was then added and the mixture steam distilled until no more oily material appeared in the distillate. The residual mixture was extracted thoroughly with ethyl acetate and the combined extracts washed successively with dilute hydrochloric acid, water, 5% aqueous sodium bicarbonate solution and saturated aqueous sodium chloride solution. After drying over anhydrous magnesium sulfate, the solution was concentrated in vacuo to an oily residue.

This oily product was dissolved in 50 ml. of methanol and the solution treated with 0.5 ml. of concentrated hydrochloric acid under nitrogen. After stirring for ca. 18 hours at room temperature the solution was concentrated in vacuo to ca. ⅕ of the original volume. Dilution with water precipitated an oil which was extracted with ethyl acetate. The combined extracts were washed with 5% aqueous sodium bicarbonate solution, water and saturated aqueous sodium chloride solution, dried over anhydrous magnesium sulfate and concentrated in vacuo to an oil.

The oily product was purified by chromatography on neutral alumina. The fractions eluted with 1:1 benzene-hexane were combined and evaporated to dryness in vacuo. The purified oily caproate was distilled at 0.055 mm. of mercury and 198–203° bath temperature to give a waxy solid, M.P. 42–50°, $\lambda_{max.}^{EtOH}$ 241 mμ (ε12,500), $\lambda_{max.}^{KBr}$ 5.77, 5.84, 5.99, 6.11, and 11.50

EXAMPLE X

*Dehydrogenation of 6α,16α-Dimethyl-17α-Hydroxyprogesterone With Chloranil*

A mixture of 0.16 g. of 6α,16α-dimethyl-17α-hydroxyprogesterone (VII), 0.30 g. of chloranil and 0.20 ml. of glacial acetic acid in 15 ml. of t-butanol was heated under reflux for 16 hours, then cooled, diluted with methylene chloride and filtered. The filtrate was washed with water, 5% aqueous sodium hydroxide solution, water and saturated sodium chloride solution. Evaporation in vacuo afforded an oily solid, 0.16 g. Several recrystallizations of this residue from acetone-Skellysolve B mixtures gave Δ⁶ - dehydro - 6,16α - dimethyl-17α-hydroxyprogesterone (XI) melting at 224–229.5°, $[\alpha]_D^{29}$ +27.9° (chloroform), $\lambda_{max.}^{EtOH}$ 290 mμ (ε23,200), $\lambda_{max.}^{CCl_4}$ 5.83, 5.90, 5.99, 6.13, and 6.29μ

EXAMPLE XI

*Acetylation of Δ⁶-Dehydro-6,16α-Dimethyl-17α-Hydroxyprogesterone*

To a solution of 0.38 g. of Δ⁶-dehydro-6,16α-dimethyl-17α-hydroxyprogesterone (XI) in 20 ml. of glacial acetic acid was added 2.0 ml. of acetic anhydride followed by 0.15 g. of p-toluenesulfonic acid. After standing for 22 hours at room temperature the mixture was poured into 300 ml. of water. The oil which separated was extracted with ethyl acetate. The extracts were washed with 5% aqueous sodium bicarbonate solution and saturated sodium chloride solution, dried and evaporated in vacuo to an oil. This oil was taken up in 20 ml. of methanol and 0.2 ml. of concentrated hydrochloric acid added. After standing for 2 hours at room temperature 100 ml. of water was added and the resulting precipitate removed by filtration giving 0.40 g. of Δ⁶-dehydro-6,16α-dimethyl-17α-acetoxyprogesterone (XIV) melting at about 163–180°. Successive recrystallization from Skellysolve B raised the melting point to 189.5–195°, $[\alpha]_D^{26}$ +25.6° (chloroform), $\lambda_{max.}^{EtOH}$ 288 mμ (ε24,900), $\lambda_{max.}^{CCl_4+CS_2}$ 5.73, 5.83, 6.00, 6.14, 6.30, 8.03, and 11.39μ

EXAMPLE XII

*Preparation of Δ⁶-Dehydro-6,16α-Dimethyl-17α-Hydroxyprogesterone Caproate*

To 1.1 g. of Δ⁶-dehydro-6,16α-dimethyl-17α-hydroxyprogesterone (XI) was added 50 ml. of n-hexanoic acid and 15 ml. of n-hexanoic anhydride. After flushing with nitrogen, 0.85 g. of p-toluenesulfonic acid monohydrate was added and the mixture stirred for 66 hours at room temperature. Five ml. of pyridine was then added and the mixture steam distilled until no more oily distillate appeared. The suspension of oily product remaining was extracted with ethyl acetate and the extracts were washed as follows: once with dilute hydrochloric acid, once with water, once with 5% aqueous sodium bicaronate solution and once with saturated sodium chloride solution. After drying, the solvent was evaporated in vacuo to give an oil.

The oil was taken up in 50 ml. of methanol and 0.5 ml. of concentrated hydrochloric acid added. After standing for 2 hours the mixture was diluted with water and extracted with ethyl acetate. The extracts were washed with saturated sodium chloride solution, dried and evaporated in vacuo to an oil which was dissolved in Skellysolve B and placed on 30 g. of alumina. Mixtures of Skellysolve B and benzene eluted the Δ⁶-dehydro-6,16α-dimethyl-17α-hydroxyprogesterone caproate (XIV) as an oil, 1.16 g. The purified oily caproate was distilled at 0.04 mm. of mercury and 199–204° bath temperature to give a glassy solid, $[\alpha]_D^{29}$ +7.4° (1%, CHCl₃), $\lambda_{max.}^{EtOH}$ 290 mμ (ε22,800), $\lambda_{max.}^{CCl_4}$ 5.76, 5.85, 6.02, 6.15, 8.58, and 11.38 mμ

EXAMPLE XIII

*Dehydrogenation of Δ⁶ - Dehydro-6,16α-Dimethyl-17α-Acetoxyprogesterone With 2,3-Dichloro-5,6-Dicyanobenzoquinone*

A mixture of 0.95 g. of Δ⁶-dehydro-6,16α-dimethyl-17α-acetoxyprogesterone and 1.0 g. of 2,3-dichloro-5,6-dicyanobenzoquinone in 50 ml. of benzene was heated under reflux for 5 hours. The suspension of solid was diluted with an equal volume of methylene chloride and filtered. The filtrate was washed successively with 5% aqueous sodium hydroxide solution (twice), water (twice) and with saturated sodium chloride solution, then dried over anhydrous magnesium sulfate and the solvents removed in vacuo to give an amorphous product. A solution of this product in benzene was placed on a column of alumina and the steroid eluted with mixtures of benzene and Skellysolve B. Mixtures of these solvents in the ratio of 1:1 eluted the Δ¹,⁶-bisdehydro-6,16α-dimethyl-17α-acetoxyprogesterone (XIII), 0.44 g., M.P. 161–166°. Recrystallization from Skellysolve B afforded the pure material melting at 161.5–163°, [α]$_D^{27}$ —24.2° (chloroform), $\lambda_{max.}^{EtOH}$ 228 mμ (ε12,000), 256 mμ (ε8,470) and 302 mμ (ε11,540), $\lambda_{max.}^{CCl_4}$ 5.72, 5.82, 6.01, 6.18, 6.28, 8.02 and 11.22μ

EXAMPLE XIV

*Dehydrogenation of 6α,16α-Dimethyl-17α-Acetoxy progesterone With 2,3-Dichloro-5,6-Dicyanobenzoquinone*

A mixture of 1.01 g. of 6α,16α-dimethyl-17α-acetoxyprogesterone (VIII) and 0.85 g. of 2,3-dichloro-5,6-dicyanobenzoquinone in 50 ml. of benzene was heated under reflux for 4½ hours. The suspension of solid was diluted with 50 ml. of methylene chloride and filtered. The filtrate was further diluted with 100 ml. of ethyl ether and washed successively with dilute aqueous sodium hydroxide solution, water and saturated salt solution. After drying over anhydrous magnesium sulfate and filtering, the solution was evaporated to dryness in vacuo to give an oily product. Chromatography on alumina as above gave Δ¹ - dehydro-6α,16α-dimethyl-17α-acetoxyprogesterone (XII), which on recrystallization from acetone-hexane afforded the pure material, M.P. 167–170°, $\lambda_{max.}^{EtOH}$ 245 mμ (ε15,000)

It is to be understood that the invention is not to be limited to the exact details of operation or exact compounds shown and described, as obvious modifications and equivalents will be apparent to one skilled in the art, and the invention is to be limited only by the scope of the appended claims.

The embodiments of the invention in which an exclusive property or privilege is claimed are defined as follows:

1. A steroid compound selected from the group consisting of the 20-cis and trans forms of

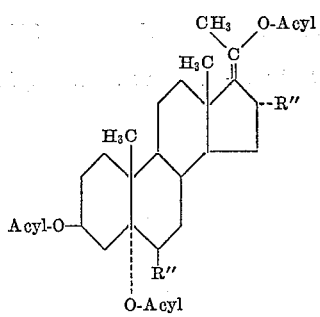

where Acyl is a hydrocarbon acyl group having from 1 to 12 carbon atoms and R″ is an alkyl group having from 1 to 8 carbon atoms.

2. A steroid compound as defined in claim 1 in which R″ is methyl.
3. A steroid compound as defined in claim 2 in which Acyl is acetyl.
4. A steroid compound as defined in claim 3 in which R″ is methyl.
5. A steroid compound selected from the group consisting of the 20-cis and trans forms of

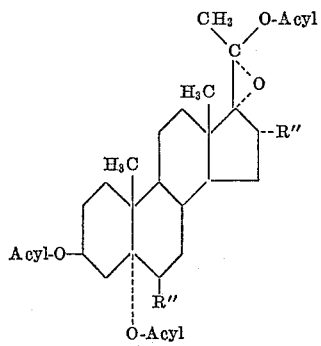

where Acyl is a hydrocarbon acyl group having from 1 to 12 carbon atoms and R″ is an alkyl group having from 1 to 8 carbon atoms.

6. A steroid compound as defined in claim 5 in which R″ is methyl.
7. A steroid compound as defined in claim 5 in which Acyl is acetyl.
8. A steroid compound as defined in claim 7 in which R″ is methyl.
9. In a process of preparing steroid compounds having the formula

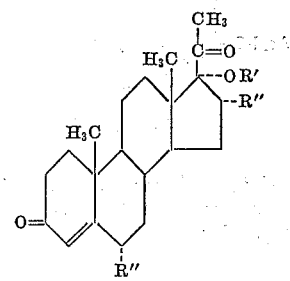

where R′ is selected from the group consisting of H and

where R is selected from the group consisting of alkyl, cycloalkyl, aralkyl and alkoxyaralkyl groups in which the alkyl group has from 1 to 12 carbon atoms and the aryl group is phenyl, and R″ is an alkyl group having from 1 to 8 carbon atoms, the sequence of steps comprising (a) treating a compound having the formula

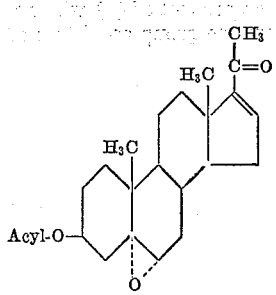

in which Acyl is a hydrocarbon acyl group having from 1 to 12 carbon atoms, with an alkyl magnesium halide in which the alkyl has from 1 to 8 carbon atoms followed by treatment with a hydrocarbon acylating agent having from 1 to 12 carbon atoms to provide 20-cis and trans forms of the compound

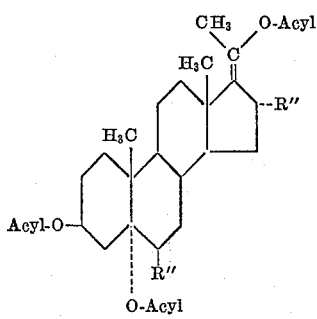

where Acyl and R″ are as previously defined, (b) treating the product of (a) with a peracid to provide 20-cis and trans forms of the compound

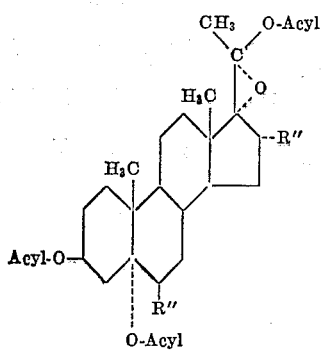

where Acyl and R" are as previously defined,
(c) hydrolyzing the product of (b) under alkaline conditions to provide

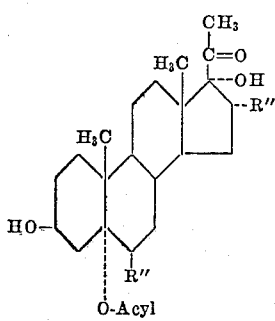

where Acyl and R" are as previously defined,
(d) treating the product of (c) with an oxidizing agent selected from the group consisting of chromium trioxide and an alkali metal dichromate thereby providing

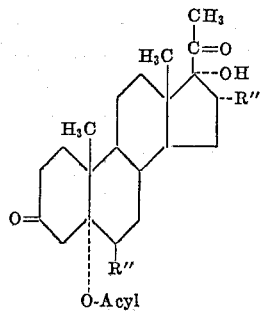

where Acyl and R" are as previously defined, and
(e) heating the product of (d) thereby providing 6α,16α-dialkyl-17α-hydroxyprogesterone in which the alkyl groups have from 1 to 8 carbon atoms.

References Cited in the file of this patent

UNITED STATES PATENTS

| | | |
|---|---|---|
| 2,878,247 | Miramontes et al. | Mar. 17, 1959 |
| 2,891,079 | Dodson et al. | June 16, 1959 |
| 2,940,968 | Sletzinger et al. | June 14, 1960 |
| 2,970,157 | Cutler et al. | Jan. 31, 1961 |
| 2,996,502 | Ruggieri et al. | Aug. 15, 1961 |
| 3,005,838 | Lincoln et al. | Oct. 24, 1961 |
| 3,019,219 | Cantrall et al. | Jan. 30, 1962 |
| 3,030,389 | Julian et al. | Apr. 17, 1962 |
| 3,031,476 | Hogg et al. | Apr. 24, 1962 |

OTHER REFERENCES

Arth et al.: "Jour. Amer. Chem. Soc.," June 20, 1958, vol. 80, pp. 3160–3161.

Babcock et al.: J.A.C.S., vol. 80, pp. 2904–5, June 5, 1958.

Bowers et al.: J.A.C.S., vol. 80, pp. 3091–3093, June 20, 1958.

Ringold et al.: J.A.C.S., vol. 81, pp. 3712–16, July 20, 1959.

UNITED STATES PATENT OFFICE
CERTIFICATE OF CORRECTION

Patent No. 3,145,199            August 18, 1964

Robert P. Graber et al.

It is hereby certified that error appears in the above numbered patent requiring correction and that the said Letters Patent should read as corrected below.

Column 5, for the lower left-hand portion of formula XII reading

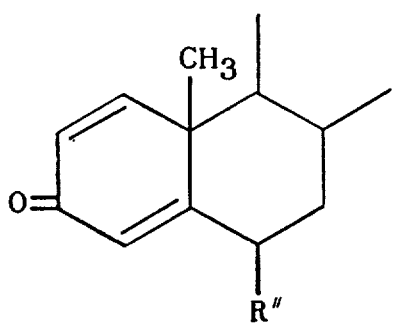 read 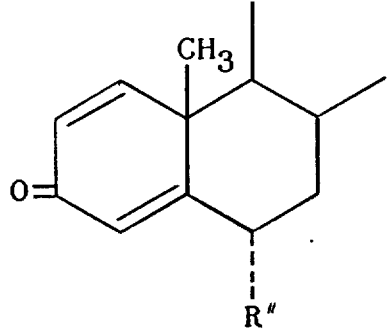

same column 5, lines 60 to 70, the formula should appear as shown below instead of as in the patent:

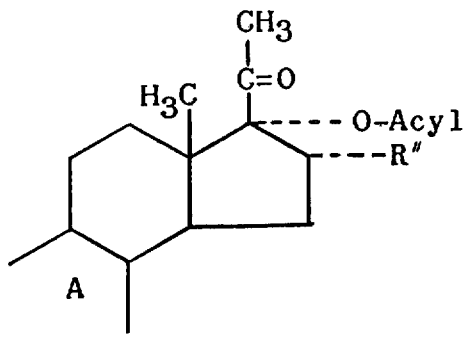

column 13, line 2, for "anr" read -- and --; line 9, for "591" read -- 5.91 --; line 67, for "233-200°" read -- 233-244° --; column 15, line 48, for "11.50" read -- 11.50μ --.

Signed and sealed this 23rd day of February 1965.

(SEAL)
Attest:

ERNEST W. SWIDER
Attesting Officer

EDWARD J. BRENNER
Commissioner of Patents